(12) United States Patent
Abehssera

(10) Patent No.: US 7,341,701 B2
(45) Date of Patent: Mar. 11, 2008

(54) METHOD, APPARATUS AND PLANT FOR TREATING CULINARY GASEOUS EFFLUENTS

(76) Inventor: Henry Abehssera, 250 Chemin Jean Leonardi, La Colle sur Loup (FR) 06480

( * ) Notice: Subject to any disclaimer, the term of this patent is extended or adjusted under 35 U.S.C. 154(b) by 375 days.

(21) Appl. No.: 10/515,847

(22) PCT Filed: Apr. 3, 2003

(86) PCT No.: PCT/EP03/03461

§ 371 (c)(1),
(2), (4) Date: Nov. 29, 2004

(87) PCT Pub. No.: WO2004/076929

PCT Pub. Date: Sep. 10, 2004

(65) Prior Publication Data

US 2005/0169792 A1 Aug. 4, 2005

(30) Foreign Application Priority Data

Feb. 27, 2003 (FR) .................... 03 02375

(51) Int. Cl.
*B01D 53/34* (2006.01)
*F23C 15/20* (2006.01)
*F23J 15/00* (2006.01)

(52) U.S. Cl. ............ 423/210; 423/237; 423/238; 423/242.1; 423/242.2; 423/242.3; 423/245.1; 423/245.2; 422/168; 422/187; 126/16; 126/299 D; 126/299 E; 126/299 F; 126/301

(58) Field of Classification Search .......... 423/210, 423/237, 238, 242.1, 242.2, 242.3, 245.1, 423/245.2; 422/168, 187; 126/16, 301, 126/299 D, 299 E, 299 F
See application file for complete search history.

(56) References Cited

U.S. PATENT DOCUMENTS 3,628,311 A * 12/1971 Costarella et al. ............ 96/228
3,731,462 A * 5/1973 Costarella et al. ............ 96/240

(Continued)

FOREIGN PATENT DOCUMENTS

FR 2 597 012 10/1987

(Continued)

OTHER PUBLICATIONS

The English abstract of FR 2,792,556 A1 published on Oct. 27, 2000.*

(Continued)

*Primary Examiner*—Timothy C. Vanoy
(74) *Attorney, Agent, or Firm*—Young & Thompson

(57) ABSTRACT

A method and apparatus (22) for treating culinary gaseous effluents (Eg) carried in an air extraction duct of a kitchen, the apparatus includes:
a unit (24) for storing in liquid form a nucleophilic active product (Pa), or odour destroyer, able to fix foul-smelling molecules in the form of inert salts,
a nebulizing and diffusing unit (26) which vaporizes or sublimates the active product (Pa) coming from the storage unit, and which diffuses the vaporized or sublimated active product (Pa) in an extraction duct (18), at ambient temperature, so as to minimize the discharge of foul-smelling molecules at the outlet of the extraction duct. A plant including this apparatus is also disclosed.

16 Claims, 1 Drawing Sheet

U.S. PATENT DOCUMENTS 3,907,525 A * 9/1975 King .............................. 96/53
4,022,118 A * 5/1977 Vandas .................... 126/299 E
4,753,218 A * 6/1988 Potter ..................... 126/299 E
5,042,457 A * 8/1991 Gallagher ............... 126/299 E
5,472,342 A * 12/1995 Welsh et al. ............ 126/299 E

FOREIGN PATENT DOCUMENTS

FR    2 792 556    10/2000
GB    2 138 127    10/1984

OTHER PUBLICATIONS

The English abstract of FR 2,597,012 A1 published on Oct. 16, 1987.*

* cited by examiner

METHOD, APPARATUS AND PLANT FOR TREATING CULINARY GASEOUS EFFLUENTS

BACKGROUND OF THE INVENTION

1. Field of the Invention

The present invention relates to an apparatus for treating culinary gaseous effluents carried in an air extraction duct of a kitchen.

2. Description of the Related Art

The present invention also relates to a plant for extracting air from a kitchen.

Anyone versed in the art of foul odour treatment will immediately recognize that the invention presented here in the form of the description of apparatus and the way said apparatus functions, also defines without ambiguity novel methods to execute the odour destruction that can be considered as well as novel inventions for which we seek patent protection.

In a kitchen, in particular in a professional catering kitchen or in an industrial culinary laboratory, the gaseous effluents produced by the culinary operations, in particular when cooking to food, are removed to the outside by means of an extractor hood and an air extraction duct which discharges outside the kitchen.

These gaseous effluents contain foul-smelling organic compounds such as ammonia ($NH_3$), sulphuric acid ($H_2S$), mercaptans, fatty acids, etc. These foul-smelling molecules arise in particular from the combustion of plant and/or animal oils when, cooking food.

The presence of these foul-smelling molecules in the gaseous effluents is a considerable source of olfactory nuisance, especially for the surroundings located close to the region discharging the gaseous effluents.

The regulations applicable to kitchens in a professional environment are becoming increasingly restrictive on this subject. French Ministerial Decree (Ministry of Agriculture) of 9 May 1995, Part 1, Chapter 1, Article 3, paragraphs 2a and 2e may be quoted for example: " . . . the (kitchen) premises must enable good hygiene practices to be implemented . . . in particular, to prevent . . . by ventilation . . . the persistence of bad smells . . . ".

To solve the problem of these bad smells, it is known to use a perfumed or deodorizing chemical product, so as to mask the bad smells in the kitchen. However, this solution is not completely satisfactory since it leads to producing a mixture of smells which may prove to be unpleasant to smell.

Furthermore, the use of a deodorant in the kitchen entails risks to the food quality. Deodorant particles may be deposited on the food or on the cooking utensils, which may cause chemical contamination of the food, or at least impair its qualities of taste.

It is also known to fit, in the kitchen, filter systems, for example based on activated charcoal, or systems using ozone to destroy the organic compounds contained in the gaseous effluents.

These solutions are expensive and they require frequent maintenance operations. In addition, the efficiency of these solutions is not always satisfactory.

SUMMARY OF THE INVENTION

The invention aims to overcome these drawbacks in a simple, economic and efficient manner.

With this aim, the invention provides an apparatus for treating culinary gaseous effluents carried in an air extraction duct of a kitchen, characterized in that it comprises:

- a unit for storing, for instance in liquid form, a nucleophilic active product, or odour destroyer, able to fix foul-smelling molecules in the form of inert salts,
- a nebulizing and diffusing unit which vaporizes or sublimates the active product coming from the storage device, and which diffuses the vaporized or sublimated active product in the extraction duct, at ambient temperature,
- so as to minimize the discharge of foul-smelling molecules at the outlet of the extraction duct.

According to other features of the invention:

- the nebulizing and diffusing unit comprises a nebulizer which is supplied with compressed air by a compressor and which vaporizes or sublimates the active product in the form of fine droplets in suspension in a stream of compressed air;
- the storage unit comprises a packaging container containing the active product which is accommodated in a detachable and complementary manner, in a housing, so as to put the inside of the container in communication with a buffer tank which is connected to the nebulizing and diffusing unit;
- the container has the overall shape of a bottle, and the bottle is placed in the housing with its neck downwards;
- the neck of the bottle is provided with a septum, before it is placed in the housing, and the housing comprises a tubular filling element complementary in shape to the neck, which is provided with means for piercing the septum, so as to put the inside of the bottle in communication with the buffer tank;
- the housing comprises a duct which communicates with the atmospheric air and which emerges near the tubular filling element, so as to make it easier for the active product to flow into the tank by replacing the active product with air as it flows out;
- the storage unit comprises means for determining the amount of active product stored;
- the storage unit and the nebulizing and diffusing unit are arranged inside a control cabinet, and the nebulizing and diffusing unit is connected to the extraction duct via a diffusion duct;
- the electrical elements of the nebulizing and diffusing unit are placed in a first compartment of the cabinet, and the other elements of the nebulizing and diffusing unit are placed, with the storage unit, in a second compartment of the cabinet;
- the operation of the nebulizing and diffusing unit is tied to the operation of an extractor hood serving to extract air towards the extraction duct;
- the nucleophilic active product is the product Nora Steam CM 8510 LO;
- the method of nebulization used in the nebulizing unit is a dry vapour nebulization method.

It should be clear that neither the nucleophilic active product nor the method of nebulization that have been indicated are limitative of the scope of the present invention. The invention also provides a plant for extracting air from a kitchen comprising an extractor hood which is equipped with a filter, and an extraction duct which routes the culinary gaseous effluents from the extractor hood to the outside, characterized in that it comprises an apparatus according to one of the previous features.

BRIEF DESCRIPTION OF THE DRAWINGS

Other features and advantages of the invention will become apparent on reading the following detailed description, for an understanding of which reference may be made to the appended drawings in which.

DETAILED DESCRIPTION OF THE PREFERRED EMBODIMENTS

Figure 1:
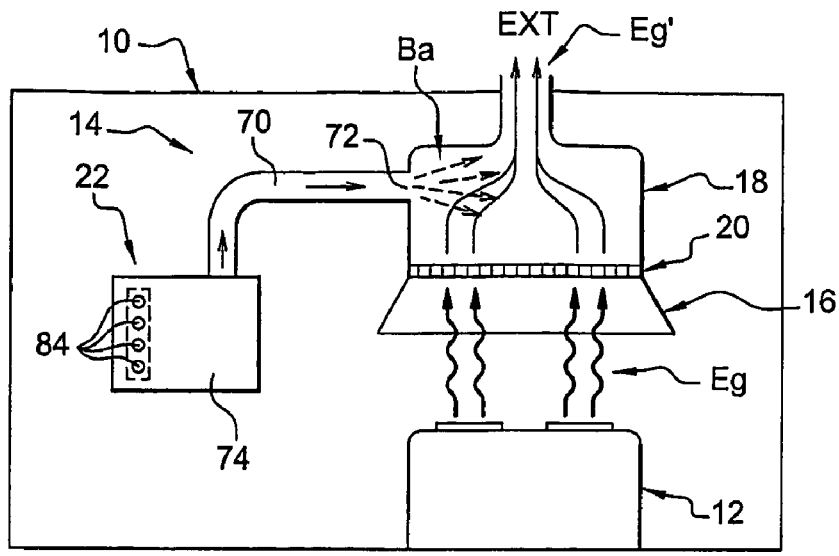
FIG. 1 is a diagram which shows a kitchen equipped with a plant and an apparatus made according to the teachings of the invention.

FIG. 1 shows a professional kitchen 10 which comprises cooking appliances 12 able to produce culinary gaseous effluents Eg when producing culinary preparations.

Conventionally, the kitchen 10 is equipped with a plant 14 for extracting air.

This plant 14 comprises an extractor hood 16 which extracts the gaseous effluents Eg from the kitchen 10 in order to discharge them outside EXT through an extraction duct 18.

The plant 14 comprises a filter which is inserted between the hood 16 and the extraction duct 18 so as to retain some of the oil particles in suspension in the gaseous effluents Eg.

According to the teachings of the invention, the plant 14 comprises an apparatus 22 which treats the gaseous effluents Eg by diffusing an active product Pa into the extraction duct 18, so as to minimize the discharge of foul-smelling molecules at the outlet of the extraction duct 18.

In FIG. 1, the gaseous effluents which are emitted outside EXT, after treatment, are referenced Eg'.

The active product Pa, or odour destroyer, is a nucleophilic product able to fix foul-smelling molecules contained in the gaseous effluents Eg in the form of inert salts.

Such an active product Pa generally consists of organic groups from the carboxylase family, which react chemically and irreversibly with foul-smelling organic compounds, especially with sulphur compounds and with nitrogen compounds, thereby producing water-soluble, stable, non-toxic and inert salts.

Preferably, the product "NORA STEAM® CM 8510 LO", marketed by Phodé, 25 rue Jean Rostand, zone artisanale Val de Caussels, 81000 Albi, France, is used. The type and brand of active products that have been specified should however not be understood as limitative of the scope of the present invention.

Figure 2:
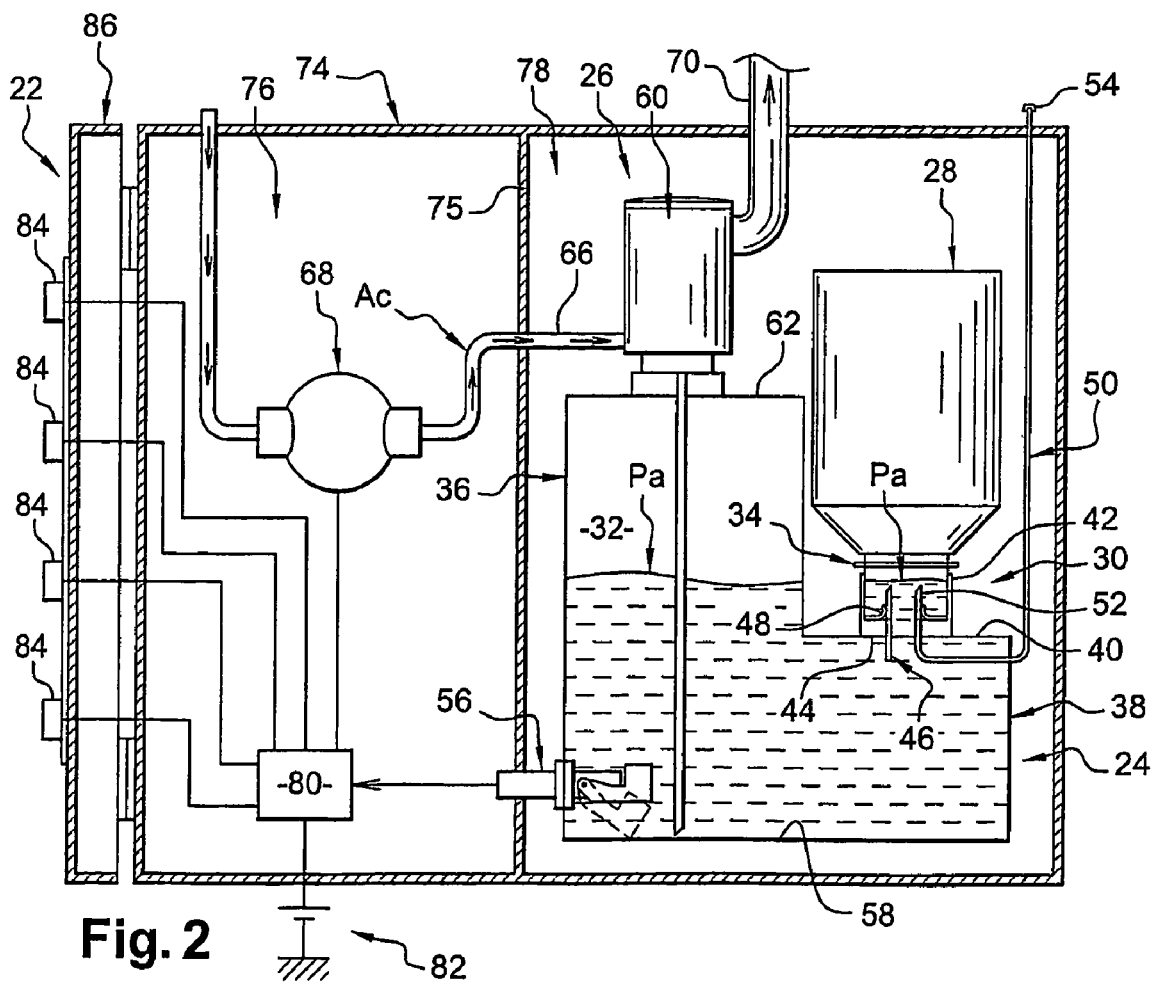
FIG. 2 is a vertical sectional view which schematically shows the apparatus of FIG. 1.

The apparatus 22 according to the invention is shown diagrammatically in a more detailed manner in FIG. 2.

As may be observed in FIG. 2, the apparatus 22 comprises a storage unit 24 and a nebulizing and diffusing unit 26.

The storage unit 24 comprises a packaging container 28 containing the active product Pa in liquid form.

The packaging container 28 is accommodated in a detachable and complementary manner in a housing 30, so as to put the inside of the container 28 in communication with a buffer tank 32 which is connected to the nebulizing and diffusing unit 26.

In this case, the packaging container 28 has the shape of a bottle which is arranged vertically in the housing 30, with its neck 34 extending downwards.

Preferably, the bottle 28 is equipped, during its packaging, with a cap and a safety ring (not shown), for example of the same type as those which are used for packaging mineral water in a plastic bottle.

The safety ring remains in place on the bottle 28, when the cap is removed, which makes it possible to distinguish a new bottle 28 from a bottle which has already been opened at least once.

In vertical section and according to the embodiment shown here, the buffer tank 32 is in the form of a capital "L"-shaped chamber. The buffer tank 32 therefore comprises a vertical parallelepipedal main portion or arm 36 and a lower horizontal parallelepipedal side portion or arm 38 which has a height less than the main portion 36.

In this case, the housing 30 is placed on the upper wall 40 of the side portion 38 of the buffer tank 32. It comprises a vertical cylindrical tubular element 42 which leads into the buffer tank 32, via a filling orifice 44 made in the upper wall 40 of the side portion 38.

The inside diameter of the tubular element 42 is slightly greater than the outside diameter of the neck 34 of the bottle 28, so as to accommodate it in a substantially complementary manner, and so that the connection between the neck 34 and the housing 30 is leaktight.

Note that the neck 34 of the bottle 28 may be screwed into the housing 30, or else be fitted into the housing 30, for example using a mounting of the bayonet type.

Preferably, the housing 30 is equipped with a perforating device 46, which is shown in FIG. 2 in the form of a rod whose upper end is pointed, and which extends vertically upwards, inside the tubular element 42.

The reason for this is that when the active product Pa is packaged in the bottle 28, before the bottle 28 is put in place in the housing 30, the neck 34 is closed off by a septum 48, or membrane.

The rod 46 therefore makes it possible to perforate the septum 48, after the bottle 28 is put in place in the housing 30, so as to put the inside of the bottle 28 in communication with the inside of the buffer tank 32.

In FIG. 2, since the bottle 28 is shown put in place in the housing 30, that is to say in the mounted position, the septum 48 is shown in the perforated state.

Advantageously, the housing 30 also comprises an air duct 50, a first end 52 of which is placed inside the tubular element 42, with its opening upwards, and a second end 54 of which is placed outside the housing 30.

The second end 54 of the air duct 50 is placed at a height greater than the height of the bottle 28 in the mounted position, so as to route the air at atmospheric pressure into the bottle 28, as the bottle 28 gradually empties into the buffer tank 32.

Note that the first end 52 of the air duct 50 is in this case bevelled, so as to form a second perforation means with the rod 46.

According to a variant embodiment (not shown), guiding means may be provided to make it easier to put the bottle 28 in the housing 30.

Advantageously, the buffer tank 32 comprises means 56 for determining the amount of active product Pa stored. In this case, these means consist of a sensor 56 comprising a dip tube which is placed in the tank 32, close to the bottom wall 58 of the tank 32.

The sensor 56 is able to transmit an electric signal, when the level of active product Pa in the tank 32 reaches a critical value, less than a minimum predetermined value.

The nebulizing and diffusing unit 26 will now be described.

In this case, the nebulizing and diffusing unit 26 comprises a nebulizer 60, or atomizer, which vaporizes the active product Pa in the form of an aerosol, that is to say in the form of a "cloud" of active product Pa called an active mist Ba, consisting of fine droplets in suspension in the air.

Note that the nebulizer 60 operates at room temperature, without it being necessary to provide means for heating the active product Pa.

Advantageously, a nebulizer 60, like those which are employed for aerosol therapy, in order to administer drugs into the respiratory tract of a patient, is used.

This type of nebulizer 60 especially makes it possible to produce fine droplets of active product Pa, that is to say droplets whose size is of the order of a few micrometres.

The active product can also be sublimated instead of vaporized.

The active product can also be stored in a non liquid form.

Now, the smaller the droplet size, the greater the surface area of exchange between the active product Pa and the foul-smelling molecules to be treated, which makes it possible to obtain very fast chemical reaction kinetics.

However, the regulations currently in force, relating to chemical products likely to be inhaled, impose a particle size greater than 5 micrometres. It is therefore necessary to use a nebulizer 60 which guarantees compliance with these regulations by producing droplets of active product Pa whose size is greater than 5 micrometres.

For example, the pneumatic nebulizer "Atomisor NL7 BSDG", marketed by Diffusion Technique Française SARL, 120 rue Bergson, 42003 Saint-Etienne, France, is used.

By suitable adjustment, this nebulizer 60 makes it possible to comply with the regulations with respect to particle size, while producing fine droplets which optimize the efficiency of the active mist Ba.

Here, the nebulizer 60 is placed on the upper wall 62 of the main portion 36 of the buffer tank 32. The nebulizer 60 is supplied with active product Pa via a first feed line 64, which extends inside the buffer tank 32, through the upper wall 62, almost down to the bottom wall 58 of the buffer tank 32.

The nebulizer 60 is also supplied with compressed air Ac via a second feed line 66.

Here, the compressed air Ac is produced, from atmospheric air, by an electric compressor 68 which is connected to the second feed line 66.

Advantageously, a compressor 68 of the type which is usually coupled with a nebulizer 60 in therapeutic applications and which makes it possible to obtain a pressure greater than 50 bar, is used.

The compressed air stream Ac produced by the compressor 68 flows through the nebulizer 60 and is then sent to the extraction duct 18, via a diffusing duct 70.

While flowing through the nebulizer 60, the compressed air stream Ac sucks the active product Pa up, by means of the Venturi effect, and transports the droplets of active product Pa into the diffusing duct 70.

The diffusing duct 70, which connects the nebulizer 60 to the extraction duct 18 and which leads into the extraction duct 18 via a hole 72, therefore makes it possible to route the active product Pa, in the form of an active mist Ba, to the extraction duct 18.

The method of nebulization used here is called dry vapour nebulization, that is to say that, since the size of the droplets is very small, the active mist Ba has virtually no effect on the hygrometry of the gaseous effluents Eg in the extraction duct 18.

Advantageously, the storage unit 24 and the nebulizing and diffusing unit 26 are placed inside a control cabinet 74.

The control cabinet 74 is preferably made of stainless steel.

In FIG. 2, the cabinet 74 is shown with its door 86 in the open position.

Preferably, the cabinet 74 comprises an inner separating partition 75 which defines a first compartment 76 in which the electrical elements of the apparatus 22 are placed, and a second compartment 78 in which the non-electric elements of the atomizing and diffusing unit 26, and the storage unit 24, are placed.

This separation makes it possible to limit the risk of electrical accidents, especially when handling the active product Pa which is in liquid form.

According to the embodiment shown here, the first compartment 76 contains the electric compressor 68 and a control unit 80, which is in particular connected to the compressor 68, to the sensor 56, and to an electrical power supply device 82.

The electrical supply device 82 consists, for example, of the electrical supply network (not shown) of the kitchen 10.

Here, the control unit 80 is connected to a series of switches 84, which are placed on the outer face of the door 86 of the cabinet 74, and which make it possible, in particular, to start and stop the apparatus 22.

Advantageously, the operation of the apparatus 22 according to the invention is tied to the operation of the extractor hood 16.

According to the preferred embodiment of the invention, the apparatus 22 operates continuously with the extractor hood 16, such that the start-up or shutdown of the hood 16 triggers the start-up or shutdown, respectively, of the apparatus 22.

The operation of the apparatus 22 and of the plant 14 according to the invention is as follows.

Initially, during the first use of the apparatus 22, a user pours active product Pa into the buffer tank 32, by means of the bottle 28.

For this purpose, the bottle 28 is mounted in its housing 30, until the rod 46 and the end 52 of the air duct 50 perforate the septum 48 which closes the neck 34.

As soon as the septum 48 is perforated, the active product Pa pours into the buffer tank 32, until the bottle 28 is empty, or until the liquid levels in the tank 32 and in the bottle 28 come into equilibrium, as in FIG. 2.

During this operation, the air duct 50 provides the inside of the bottle 28 with air, so as to replace the product Pa which has flowed out, thereby making it easier for the product Pa to flow into the tank 32.

Note that the bottle 28 may remain in place in the housing 30 until it is empty and/or it is replaced.

When the bottle 28 is empty, it can be replaced by a new bottle 28, without the supply of active product Pa to the apparatus 22 being cut off, in so far as the buffer tank 32 still contains active product Pa.

Once the buffer tank 32 contains active product Pa, the apparatus 22 is ready to operate.

When the cooking appliances 12 are used, the hood 16 is switched on, which automatically causes the compressor 68 of the apparatus 22 to start up.

The flow of the compressed air stream Ac, produced by the compressor 68, in the second feed line 66, causes, in the nebulizer 60, the active product Pa to be sucked up through the first feed line 64, and the active product Pa to be vaporized in the compressed air stream Ac.

The nebulizer 60 produces, in the diffusing duct 70, an active mist Ba, which is made up of droplets of active product Pa in suspension in the compressed air stream Ac.

The diffusing duct 70 routes the active mist Ba to the extraction duct 18 of the hood 16, where the particles of active product Pa react with the foul-smelling molecules contained in the gaseous effluents Eg.

The reaction of the active product Pa with the foul-smelling molecules produces inert salts, mainly in the form of volatile particles which are removed with the treated gaseous effluents Eg' outside EXT the kitchen 10.

The apparatus 22 and the plant 14 according to the invention therefore make it possible to treat the gaseous effluents Eg emitted in the kitchen 10, so as to discharge to the outside EXT gaseous effluents Eg' comprising very few foul-smelling molecules.

Chromatographic analyses have shown that the majority of sulphur or nitrogen molecules or the like, which are responsible for bad cooking smells, have disappeared.

It is possible to obtain an efficiency of treatment of the foul-smelling molecules of 85 to 100%, depending on the type of molecule and on their concentration in the gaseous effluents Eg.

The efficiency of the system is in particular associated with the dimensions of the droplets of active product Pa. The dimensions of the droplets are conditioned by the operating pressure of the nebulizing and diffusing unit 26, by the diameter and by the structural properties of the orifice of the nozzle (not shown) fitted to the nebulizer 60 and which vaporizes the active product Pa into the compressed air stream.

Note that the apparatus 22 and the plant 14 according to the invention do not diffuse active product Pa into the ambient air of the kitchen 10, but directly inside the extraction duct 18. This especially makes it possible to prevent the contamination of food or of culinary containers by the active product Pa.

The diffusion of the active mist Ba in the extraction duct 18 may lead to a light deposit of active product Pa on the inner walls of the extraction duct 18. This deposit contributes to the efficiency of treatment of the gaseous effluents Eg, by maximizing the surface area of exchange between the active product Pa and the foul-smelling molecules.

The packaging of the active product Pa in a bottle 28 closed by a septum 48, and the way it is placed in the storage unit 24, allows easy and safe handling of the active product Pa, which avoids the risks of food contamination.

Furthermore, because the elements of the apparatus 22 according to the invention are placed in a closed cabinet 74, use of the active product Pa and treatment of the gaseous effluents Eg is made easier, and the maintenance operations are reduced.

The invention claimed is:

1. An apparatus (22) for treating culinary gaseous effluents (Eg) carried in an air extraction duct (18) of a kitchen (10), which comprises:

- a unit (24) for storing an active product (Pa), or odor destroyer, able to fix foul-smelling molecules in the form of inert salts,
- a nebulizing and diffusing unit (26) which vaporizes or sublimates the active product (Pa) coming from the unit (24), and which diffuses the vaporized or sublimated active product (Pa) in an extraction duct (18), at ambient temperature, so as to minimize the discharge of foul-smelling molecules at an outlet of the extraction duct (18).

2. The apparatus (22) according to claim 1, wherein the nebulizing and diffusing unit (26) comprises a nebulizer (60) which is supplied with compressed air (Ac) by a compressor (68) and which vaporizes or sublimates the active product (Pa) in the form of droplets in suspension in a stream of compressed air (Ac).

3. The apparatus (22) according to claim 1, wherein the storage unit (24) comprises a packaging container (28) containing the active product (Pa), in a housing (30), so as to put the inside of the container (28) in communication with a buffer tank (32) which is connected to the nebulizing and diffusing unit (26).

4. The apparatus (22) according to claim 3, wherein the container (28) has the overall shape of a bottle, and in that the bottle (28) is placed in the housing (30) with its neck (34) downwards.

5. The apparatus (22) according to claim 4, wherein the neck (34) of the bottle (28) is provided with a septum (48), before it is placed in the housing (30), and in that the housing (30) comprises a tubular filling element (42, 44) complementary in shape to the neck (34), which is provided with means (46, 52) for piercing the septum (48), so as to put the inside of the bottle (28) in communication with the buffer tank (32).

6. The apparatus (22) according to claim 5, wherein the housing (30) comprises a duct (50) which communicates with the atmospheric air and which emerges at the tubular filling element (42, 44), 50 as to make it easier for the active product (Pa) to flow into the tank (32) by replacing the active product (Pa) with air as said active product flows out.

7. The apparatus (22) according to claim 1, wherein the storage unit (24) comprises means (56) for determining the amount of active product (Pa) stored.

8. The apparatus (22) according to claim 1, wherein the storage unit (24) and the nebulizing and diffusing unit (26) are arranged inside a control cabinet (74), and in that the nebulizing and diffusing unit (26) is connected to the extraction duct (18) via a diffusion duct (70).

9. The apparatus (22) according to claim 8, wherein the electrical elements (56, 68, 82, 84) of the nebulizing and diffusing unit are placed in a first compartment (76) of the cabinet (74), and the other elements (60) of the nebulizing and diffusing unit (26) are placed, with the storage unit (24), in a second compartment (78) of the cabinet (74).

10. The apparatus (22) according to claim 1, wherein the operation of the nebulizing and diffusing unit (26) is tied to the operation of an extractor hood (16) serving to extract air towards the extraction duct (18).

11. The apparatus according to claim 1, wherein the active product (Pa) is stored in a liquid form.

12. The apparatus according to claim 1, wherein the method of nebulization used in the nebulizing unit is a dry vapor nebulization method.

13. A plant (14) for extracting air from a kitchen (10), comprising:

- an extractor hood (16) which is equipped with a filter (20); and
- an extraction duct (18) which routes the culinary gaseous effluents (Eg) from the extractor hood (16) to the outside (EXT), wherein the plant (14) also comprises the apparatus (22) according to claim 1.

14. A method for treating culinary gaseous effluents carried in an air extraction duct of a kitchen, which comprises:

- providing an active product, or odor destroyer, able to fix foul-smelling molecules in the form of inert salts, and storing said active product;
- nebulizing said active product after it has been vaporized or sublimated after extraction from the storage device; and diffusing the nebulized active product in the extraction duct so as to minimize the discharge of foul-smelling molecules at an outlet of the extraction duct.

15. The method of claim 14, wherein said diffusion of the sublimated active product in the extraction duct is made at ambient temperature, so as to minimize further the discharge of foul-smelling molecules at the outlet of the extraction duct.

16. The method of claim 14, wherein the method purifies the air extracted from a kitchen in which an extraction duct routes the culinary gaseous effluents from one or more extractor hoods to the outside.

\* \* \* \* \*